United States Patent
Mesika et al.

(10) Patent No.: US 9,569,468 B2
(45) Date of Patent: Feb. 14, 2017

(54) DEPLOYING DATABASE UPGRADES TO MULTIPLE ENVIRONMENTS IN A DIFFERENT ORDER

(71) Applicant: Red Hat Israel, Ltd., Raanana (IL)

(72) Inventors: Eli Mesika, Givhataim (IL); Yair Zaslavsky, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 937 days.

(21) Appl. No.: 13/889,111

(22) Filed: May 7, 2013

(65) Prior Publication Data
US 2014/0337282 A1     Nov. 13, 2014

(51) Int. Cl.
G06F 9/44     (2006.01)
G06F 17/30    (2006.01)
G06F 9/445    (2006.01)
G06F 9/455    (2006.01)

(52) U.S. Cl.
CPC ........... *G06F 17/30289* (2013.01); *G06F 8/65* (2013.01); *G06F 9/45533* (2013.01)

(58) Field of Classification Search
CPC .......... G06F 8/65; G06F 8/61; G06F 9/45533
USPC ................................ 717/168, 115, 122, 170
See application file for complete search history.

(56) References Cited

U.S. PATENT DOCUMENTS

| | | | | |
|---|---|---|---|---|
| 5,809,287 A * | 9/1998 | Stupek, Jr. | ................ | G06F 8/68 703/22 |
| 9,021,008 B1 * | 4/2015 | Andrus | ................... | H04L 43/50 709/201 |
| 2005/0071839 A1 * | 3/2005 | Kim | .......................... | G06F 8/65 717/170 |
| 2005/0198630 A1 * | 9/2005 | Tamma | ..................... | G06F 8/65 717/175 |
| 2006/0161558 A1 | 7/2006 | Tamma et al. | | |
| 2007/0299858 A1 * | 12/2007 | Norcott | ............ | G06F 17/30292 |
| 2009/0300595 A1 * | 12/2009 | Moran | ..................... | G06F 8/65 717/170 |
| 2010/0250566 A1 * | 9/2010 | Paul | .................. | G06F 17/30592 707/756 |

(Continued)

OTHER PUBLICATIONS

USPTO; Office Action for U.S. Appl. No. 13/748,444 mailed Jun. 9, 2014.

(Continued)

*Primary Examiner* — Cheyne D Ly
(74) *Attorney, Agent, or Firm* — Lowenstein Sandler LLP (57) ABSTRACT

A virtualization manager receives a request to install a new feature in a first virtualization environment. The virtualization manager identifies a first database upgrade script corresponding to the new feature and compares a first identification number of the first database upgrade script to a second identification number of a second database upgrade script, the second database upgrade script previously run on a management database for the first virtualization environment. If the first identification number is less than the second identification number, the virtualization manager generates a copy of the first database upgrade script and names the copy of the first database upgrade script with a third identification number that is greater than the second identification number. The virtualization manager then runs the copy of the first database upgrade script on the management database.

21 Claims, 7 Drawing Sheets

(56) References Cited

U.S. PATENT DOCUMENTS

| | | | |
|---|---|---|---|
| 2011/0213759 A1* | 9/2011 | Zazrivec | G06F 17/30297 |
| | | | 707/695 |
| 2012/0216135 A1* | 8/2012 | Wong | G06F 9/45533 |
| | | | 715/764 |
| 2013/0117738 A1 | 5/2013 | Livingston et al. | |
| 2014/0095432 A1 | 4/2014 | Trumbull et al. | |
| 2014/0137073 A1 | 5/2014 | Dees, Jr. et al. | |
| 2014/0208303 A1 | 7/2014 | Asayag et al. | |

OTHER PUBLICATIONS

USPTO; Office Action for U.S. Appl. No. 13/748,444 mailed Dec. 30, 2014.

\* cited by examiner

DEPLOYING DATABASE UPGRADES TO MULTIPLE ENVIRONMENTS IN A DIFFERENT ORDER

TECHNICAL FIELD

This disclosure relates to the field of virtualization and, in particular, to deploying database upgrades to multiple environments in a different order.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the virtual machine.

A host controller in the virtualization system may include a virtualization manager to manage the allocation of resources from host servers to virtual machines, monitor the status of the virtual machines, as well as the progress of commands and processes being executed by the virtual machines and generally manage operations in the system. The host controller may maintain a management database with entries pertaining to the various entities in the virtualization system (e.g., host computers, virtual machines, virtual disks). Each entry may include data representing the status of the corresponding entity. The database may be organized according to a particular schema. The schema defines the structure of the database and controls the organization of the data.

Over time, as new features are added to the virtualization system, the management database is upgraded to reflect changes caused by the new features. Typically a series of one or more upgrade scripts may be run on the database to update the schema or data contained in the database. In conventional systems, the upgrades scripts are run according to an upgrade script number which uniquely identifies the script. If for some reason, the upgrade process of the virtualization manager attempts to run the scripts out of numerical order (e.g., to install one feature before another), certain scripts may be inadvertently skipped because they have a lower upgrade script number. Certain scripts may have lower upgrade script numbers because they were developed prior to other scripts, although they may be introduced (i.e., installed) later. This may cause the management database to not reflect all of the desired features.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Described herein is a method and system for introducing various features to multiple environments in a different order. Multiple environments may include, for example, an upstream environment for use by a development community, a downstream environment for use by a customer, or other environment. Features may include, for example, support in a virtual machine for external plug-ins, support for new virtual machine scheduling, or some other features. In one embodiment, when a new feature is to be added to a virtualization manager development environment, a script management module can identify any database upgrade scripts that are associated with the new feature. In one embodiment, a single feature may have more than one database upgrade script 108 associated with it. In this case, each database upgrade script may be run on a management database in order to fully complete the upgrade. In one embodiment, each database upgrade script may have a naming convention that includes an identification number to uniquely identify the script. For example, the name of each database upgrade script may include an eight digit number where the first four digits represent a version number of the feature (e.g., 0301 for version 3.1) and the last four digits represent a script identification number (e.g., 0010). The database scripts may have identification numbers that increase sequentially based on an order in which the script development was completed. For example, if scriptA is completed before scriptB, scriptA may have a lower identification number. In one embodiment, there is a minimum gap between identification numbers (e.g., 10) so that a sample series of identification numbers may include 0010, 0020, 0030, etc.

In one embodiment, the virtualization manager is designed to run the database upgrade scripts on management database based on the order of the identification numbers. However, since the numbering of the scripts is based on the order in which they were developed, the order in which they are to be run may not match the order of the identification numbers.

In one embodiment, a database interface module determines the upgrade script identification number of the last database upgrade script previously run on the management database. The database interface module may consult a schema version table which includes an indication of each database upgrade script that has been run on the management database. The database interface module may compare the identification number or numbers of the script associated with the new feature to be installed (i.e., the candidate upgrade script) with the highest identification number stored in the schema version table. If the identification number of the candidate upgrade script is greater than the highest identification number in the schema version table, the script management module may run the candidate upgrade script on the database. If the identification number of the candidate upgrade script is less than the highest identification number in schema version table, installation of the candidate script may be skipped unless it is renamed with a higher identification number than the last installed script.

In one embodiment, to perform a script renaming operation, the script management module may make a copy of the candidate upgrade script and name that copy with a new name including an identification number that is greater than the highest identification number in the schema version table. For example, if there are two features to be installed, F1 and F2 where F1 has a script numbered 0010 and F2 has scripts numbered 0020 and 0030, in one environment F2 may be introduced before F1. Thus, when installing F1, the original identification number of the candidate upgrade script may be 0010 and the highest identification number in the schema version table is 0030. In this case, the script management module may assign an identification number 0031 to the copy of the candidate script for F1. This identification number takes advantage of the gap between identification numbers in the sequence and is not required to have a minimum gap between other identification numbers. Once the identification number on the copy is updated, the script management module may be able to run the copy of the database upgrade script on the management database because the identification number of the copy is greater than the highest identification number in the schema version table.

Using the methods and operations described herein, the same set of features, and their corresponding database upgrade scripts may be installed in different virtualization environments in potentially different orders. The virtualization manager can change the identification numbers of the database upgrade scripts so that they may be run in an arbitrary order. This allows for greater flexibility in the manner in which new features and upgrades are rolled out in virtualization systems.

Figure 1:
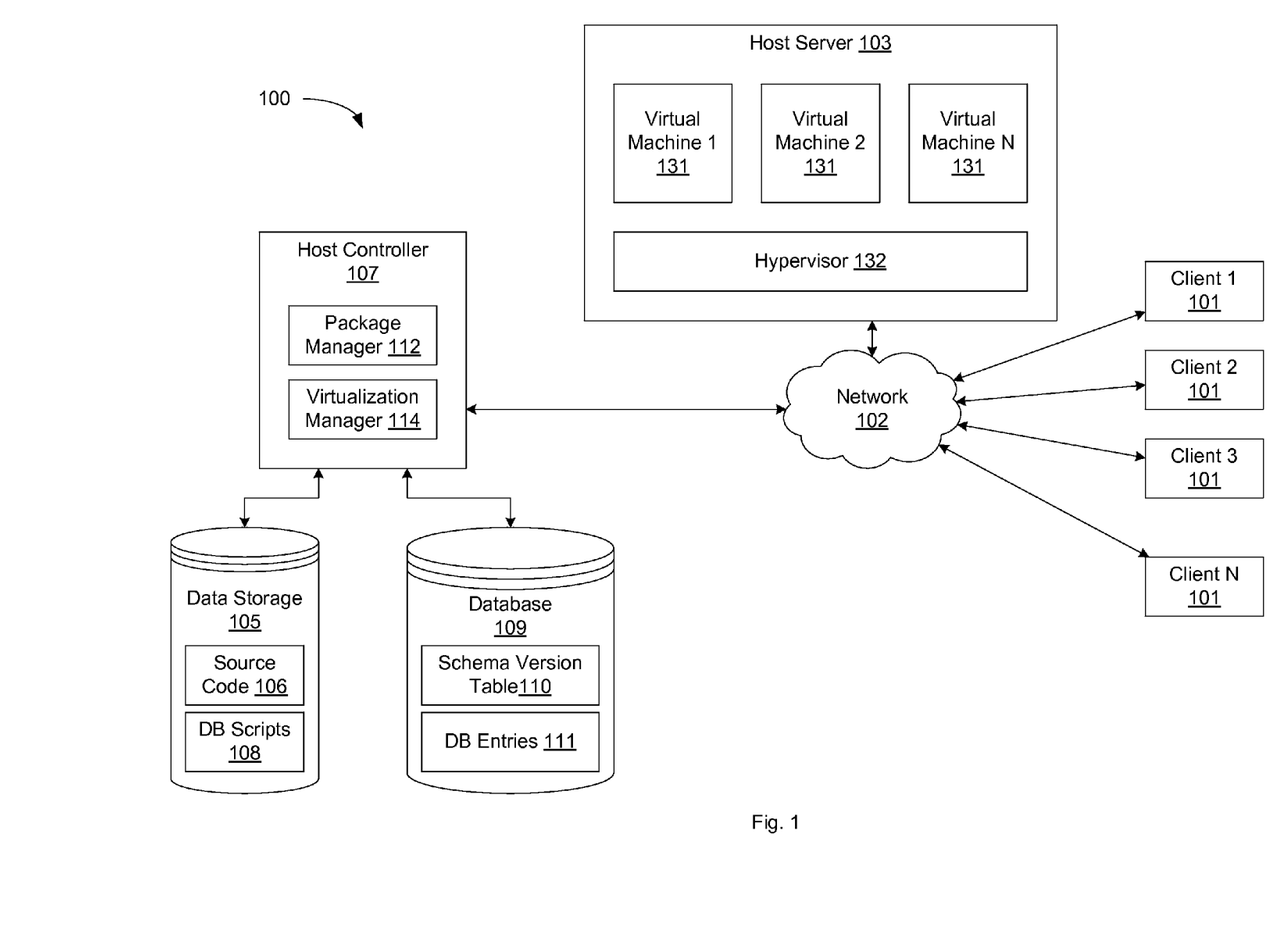
FIG. 1 is a block diagram illustrating an exemplary network architecture in which embodiments of the present invention may operate.

FIG. 1 illustrates an exemplary network architecture 100 in which embodiments of the present invention may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via the same or a different network or directly). Host controller 107 may be an independent machine such as a server computer, a desktop computer, etc. Alternatively, the host controller 107 may be part of the host server 103. In one embodiment, the network architecture 100, including host controller 107, host servers 103 and clients 101, may be referred to as a virtualization environment.

In one embodiment, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The host server 103 may include a hypervisor 132 that emulates the underlying hardware platform for the virtual machines 131. The hypervisor 132 may also be known as a virtual machine monitor (VMM) or a kernel-based hypervisor.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each virtual machine 131 may be linked to one or more virtual disks. These virtual disks can be logical partitions of a physical disk managed by hypervisor 132, can be cloud based storage devices, or can be some other type of virtual storage device. In one embodiment, virtual disks may form a whole or part of a logical data center. In one embodiment, virtual machines 131 and virtual disks, together with host servers 103, may be collectively referred to as entities in a virtual machine system.

The virtual machines 131 and virtual disks are managed by the host controller 107. Host controller 107 may manage the allocation of resources from host server 103 to virtual machines 131. In addition, host controller may monitor the status of virtual machines 131 as well as the progress of commands and processes being executed by virtual machines 131 and/or on virtual machines 131. The host controller 107 may include a virtualization manager 114 to perform management operations in the virtualization system, including for example allocating resources of host servers 103 to virtual machines 131, monitoring the status of virtual machines 131, monitoring the progress of commands and processes being executed by virtual machines 131, etc. The host controller 107 may also maintain a management database 109 used by the virtualization manager 114 for the above management operations. The management database 109 includes entries 111 pertaining to the various entities in the virtualization system (e.g., host computers, virtual machines, virtual disks). Each entry 111 may include data representing the status of the corresponding entity. The database may be organized according to a particular schema that defines the structure of the database 109 and controls the organization of the data. In one embodiment, the schema includes database objects, such as Tables, Indices, Sequences, Stored-Procedures, and/or Constraints (primary-key, foreign key, unique-key, not null). The schema may be built by a set of database scripts which contain the SQL statements for creating or modifying the database objects mentioned above. In addition, the database scripts add data to the database used by the virtualization manager to operate properly. The data may be added in accordance to the database objects in the schema.

In one embodiment, management database 109 further includes schema version table 110. Schema version table 110 may be a table or other data structure that stores at least a portion of the database upgrade scripts, such as scripts 108, that have been previously run on management database 109. Schema version table 110 may include an entry for each database upgrade script previously run and may store information for those scripts including, for example, an upgrade script number, a name of the script, information about who installed the script, when the script was run, where the installation was successful, and/or other information. The data in schema version table 110 may be used to recreate the current state of database 109 at any given point in time by indicating the database upgrade scripts that were previously run.

In one embodiment, the virtualization manager 114 includes source code 106 as well as one or more database scripts 108 that may be executed upon database 109. The database scripts 108, for example, may be designed to execute read or write operations on the entries 111 of database 109. Accordingly, the database scripts 108 should be compatible with the database schema to ensure that the operations of the database scripts 108 are carried out accurately. In one embodiment, the source code 106 and database scripts 108 are maintained in data storage 105 attached to host controller 107. The data storage 105 may share the machine with the host controller 107 (e.g., a disk drive in the host controller computer) or be an independent device coupled to the host controller directly or via a network (e.g., as a network-attached storage device (NAS)). In one embodiment, database 109 may be included on the same data storage 105 (as shown in FIG. 2) or on a separate storage device.

In one embodiment, host controller 107 also includes a package manager 112 to install, upgrade, or configure software packages on the host controller 107 in a consistent manner. In one embodiment, package manager 112 is the RPM package manager from Red Hat, Inc. For example, the package manager 112 may be used to install or upgrade the virtualization manager 114 on the host controller 107.

Figure 2:
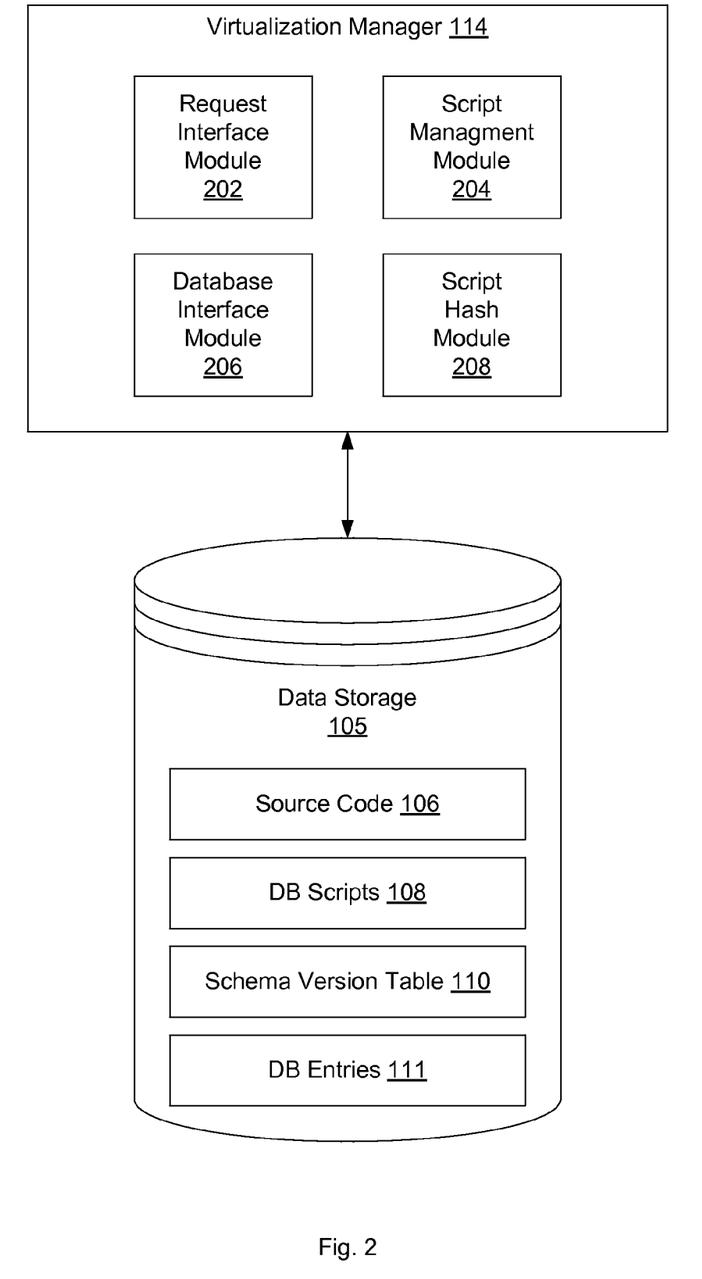
FIG. 2 is a block diagram illustrating a virtualization manager for deploying database upgrades to multiple environments in a different order, according to an embodiment.

FIG. 2 is a block diagram illustrating a virtualization manager for deploying database upgrades to multiple environments in a different order, according to an embodiment of the present invention. The virtualization manager 114 may include request interface module 202, script management module 204, database interface module 206 and script hash module 208. In one embodiment, virtualization manager 114 is connected to data store 105, which may include source code 106 (e.g., for virtualization manager 114 or other applications), database scripts 108, schema version table 110 and one or more database entries 111. In other embodiments, virtualization manager 114 may include different and/or additional components, which are not shown in order to simplify the description. Data store 105 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, request interface module 202 receives a request to install a new feature in the virtualization environment. The request may be to install a new application or to upgrade or modify a currently installed application to a new version. The new feature may include new functionality for the system based on developments in the field of virtualization and may include for example, support in a virtual machine 131 for external plug-ins, support for new virtual machine 131 scheduling, or some other feature. In one embodiment, the request may be directed to a virtualization management application, such as virtualization manager 114. In other embodiments, the request may specify any other application to be installed and/or upgraded. The request may be received at the host controller 107, for example, from any entity in the virtualization system, such as one of client devices 101, host server 103, virtual machines 131, or some other entity.

In one embodiment, script management module 204 identifies any database upgrade scripts 108 that are associated with the new feature that is being installed and/or upgraded. The database scripts 108 may include queries, instructions, etc. to be executed against management database 109. The database scripts 108 may have queries in a particular syntax and may refer to attributes in the database entries 111 by particular attribute names. In one embodiment, a single feature may have more than one database upgrade script 108 associated with it. In this case, each database upgrade script may be run on management database 109 in order to fully complete the upgrade. In one embodiment, each database upgrade script may have a naming convention that includes an identification number to uniquely identify the script. For example, the name of each database upgrade script may include an eight digit number where the first four digits represent a version number of the feature (e.g., 0301 for version 3.1) and the last four digits represent a script identification number (e.g., 0010). The database scripts 108 may have identification numbers that increase sequentially based on an order in which the script development was completed. For example, if scriptA is completed before scriptB, script A may have a lower identification number. In one embodiment, there is a minimum gap between identification numbers (e.g., 10) so that a sample series of identification numbers may include 0010, 0020, 0030, etc.

In one embodiment, virtualization manager 114 is designed to run the database upgrades scripts 108 on management database 109 based on the order of the identification numbers. For example, when request interface module 202 receives a request to install a feature, request interface module 202 may instruct script management module 204 to locate and run the associated database upgrade scripts 108. Normally, script management module 204 would run the scripts in sequential order. However, since the numbering of the scripts is based on the order in which they were developed, the order in which they are to be run may not match the order of the identification numbers.

In one embodiment, database interface module 206 determines the upgrade script identification number of the last database upgrade script run on management database 109. Database interface module 206 may read schema version table 110 which includes an indication of each database upgrade script that has been run on management database 109. Database interface module 206 may compare the identification number or numbers of the scripts associated with the new feature to be installed (i.e., the candidate upgrade script(s)) with the highest identification number stored in schema version table 110. If the identification number of the candidate upgrade script is greater than the highest identification number in schema version table 110, database interface module 206 may instruct script management module 204 to run the candidate upgrade script on database 109. If the identification number of the candidate upgrade script is less than the highest identification number in schema version table 110, installation of the candidate script may be skipped unless it is renamed with a higher identification number than the last installed script. In one embodiment, virtualization manager 114 is configured to rename any candidate script that has a lower identification number. In another embodiment, virtualization manager 114 first checks whether the script has previously been run on the database 109, for example, by using the verification method of FIG. 6, before renaming the candidate script. In yet another embodiment, virtualization manager 114 provides a notification to a developer or system administrator who can either authorize the renaming of the script or manually rename the script.

In one embodiment, to perform a script renaming operation, script management module 204 may make a copy of the candidate upgrade script and name that copy with a new name including an identification number that is greater than the highest identification number in schema version table 110. For example, if there are two features to be installed, F1 and F2 where F1 has a script numbered 0010 and F2 has scripts numbered 0020 and 0030, in one environment F2 may be introduced before F1. Thus, if the original identification number of the candidate upgrade script was 0010 and the highest identification number in schema version table 110 was 0030, script management module 204 may assign an identification number to the copy of 0031. This identification number takes advantage of the gap between identification numbers in the sequence and is not required to have a minimum gap between other identification numbers. Once the identification number on the copy is updated, script management module 204 may be able to run the copy of the database upgrade script on management database 109 because the identification number of the copy is greater than the highest identification number in the schema version table 110.

In another embodiment, if virtualization manager 114 knows that a feature with associated scripts having lower numbers will be installed after a candidate script, the script management module 204 may change the identification number of the candidate script even though the candidate script could be run with its current identification number. For example, if the identification number of the candidate script was 0060, and the highest identification number in schema version table 110 is 0020, the candidate script could be run. If, however, a database upgrade script 108 having identification number 0030 is designed to run after the candidate script, script management module 204 may update the identification of the candidate script to 0021, so that both it and the script with number 0030 can run without interruption.

In one embodiment, script hash module 208 can determine whether a script has been previously run on database 109. For example, if a copy of a database upgrade script is made and numbered with a lower identification number, script management module 204 may eventually try to run the original upgrade script having the higher number. Script hash module 208 can use a hash algorithm to determine whether the script has been previously run and thus, whether the script needs to be run again. The hash algorithm may be a cryptographic hash algorithm, such as SHA-2, MD5, or another hash algorithm. In other embodiments, some other function may be used, such as a fingerprinting algorithm, checksum, or other function. The function may compute hashes over fixed or variable sized content. Additional details of this process are provided below.

Figure 3:
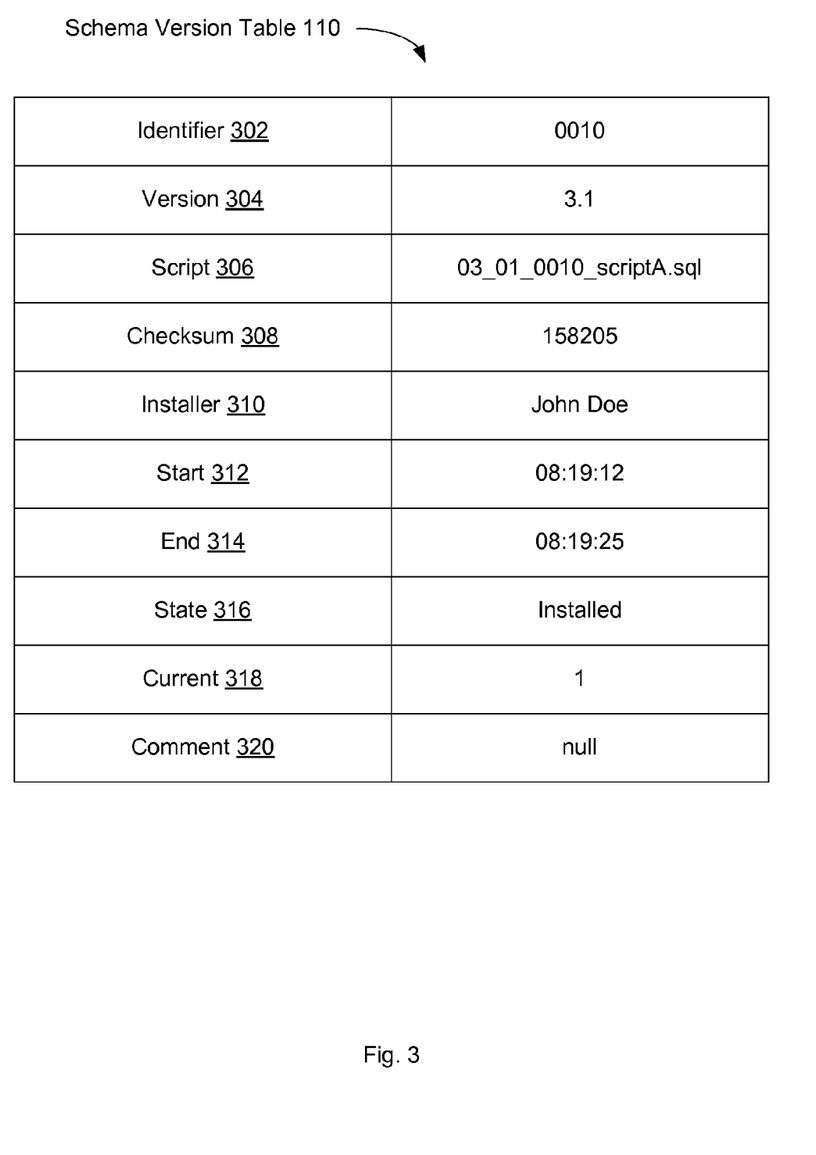
FIG. 3 is a block diagram illustrating a schema version table in a management database, according to an embodiment.

FIG. 3 is a block diagram illustrating a schema version table in a management database, according to an embodiment. Schema version table 110 may be a table or other data structure that stores at least a portion of the database upgrade scripts, such as scripts 108, that have been previously run on management database 109. Schema version table 110 may include an entry for each database upgrade script previously run and may store information for those scripts including, for example, an upgrade script number, a name of the script, information about who installed the script, when the script was run, where the installation was successful, and/or other information. The data in schema version table 110 may be used to recreate the current state of database 109 at any given point in time by indicating the database upgrade scripts that were previously run. FIG. 3 illustrates an entry for one database upgrade script 108 having multiple data values 302-320. In other embodiments, schema version table 110 may include additional entries for other scripts, each having the same or similar data values.

In one embodiment, identifier 302 is the upgrade script identification number discussed above. Database scripts 108 may have identification numbers that increase sequentially based on an order in which the script development was completed. For example, if scriptA is completed before scriptB, script A may have a lower identification number (e.g., 0010). In one embodiment, there is a minimum gap between identification numbers (e.g., 10) so that a sample series of identification numbers may include 0010, 0020, 0030, etc. Version 304 may be a version (e.g., version 3.1) of an application being installed on host controller 107 that includes the feature with which the current database upgrade script is associated. The version 304 may include a major version number (e.g., 3) and a minor version number (e.g., 1). A change in the major version number may indicate a significant change or upgrade, while minor changes may be reserved for minor version updates. Script name field 306 may include the full name of the database updgrade script. For example, the script name may include a concatenation of the version number, the identification number and a textual identifier (e.g., scriptA) that uniquely identifies the particular script.

In one embodiment, checksum field 308 includes a checksum or hash value of the script, which may be created by applying one of the hash algorithms described above to the script itself. This checksum or hash value may be used to determine whether the upgrade script has already been run on the management database 109. Installer field 310 may include an indication of an individual or entity that installed the script and start 312 and end field 314 may indicate when the script started to run and when the script finished running, respectively.

State field 316 provides an indication of the state of the database upgrade script. Example states can include "installed," "failed," or "skipped." Current field 318 may include a flag that indicates whether this script was the last database upgrade script to be successfully installed on the management database. The flag may be set to "1" if this script was the last script to be installed. Otherwise the flag may be set to "0." Comment field 320 may include a description when state field 316 is set to "failed" or "skipped." Comment field 320 may include a description of the error that occurred when the installation "failed" or a description of why the script was not installed when the installation was "skipped." In the case of a successful installation, comment field 320 may have a null value or be left blank.

Figure 4:
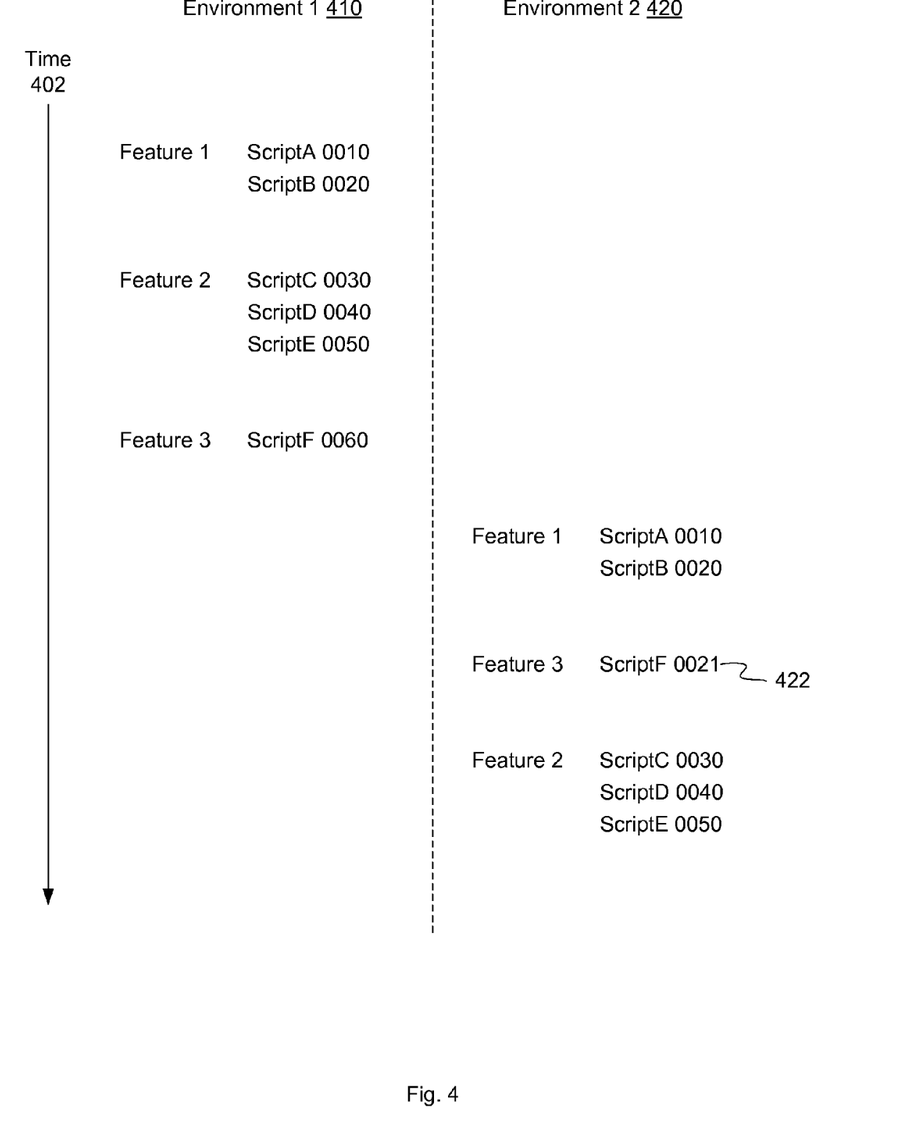
FIG. 4 is a diagram illustrating the deployment of database upgrades to multiple environments in a different order, according to an embodiment.

FIG. 4 is a diagram illustrating the deployment of database upgrades to multiple environments in a different order, according to an embodiment. FIG. 4 illustrates an embodiment where there are two virtualization environments 410 and 420. Each of virtualization environments 410 and 420 may include a system similar to that described above with respect to FIG. 1. FIG. 4 illustrates an embodiment where different features (e.g., Feature 1, Feature 2, Feature 3) are installed in each environment 410 and 420 in a different order. In FIG. 4, time 402 proceeds from top to bottom, such that a feature, and its corresponding database upgrade scripts, at the top of the diagram is installed and/or run before a feature at the bottom of the diagram.

In one embodiment, the goal is to install the same set of features (e.g., Feature 1, Feature 2, Feature 3) in each virtualization environment 410 and 420, but to install the features in a potentially different order. The features may be installed in a different order for any number of reasons, such as a particular feature being more important to the users of one environment but less important to the users of the other environment. In one embodiment, each feature may have one or more associated database upgrade scripts. The upgrade scripts may be run on management database 109 in order to update the database to reflect the changes that accompany the new feature. In one embodiment, Feature 1 includes upgrade scripts ScriptA and ScriptB, Feature 2 includes ScriptC, ScriptD and ScriptE and Feature 3 includes ScriptF. In one embodiment, each of the database upgrade scripts includes a script identification number. The script identification number may be assigned based on the order in which development of the scripts was completed. For example, the identification numbers may include: ScriptA 0010, ScriptB 0020, ScriptC 0030, ScriptD 0040, ScriptE 0050, and ScriptF 0060. This order may or may not match the order in which the scripts are to be run on the management database 109.

In one embodiment, in environment 1 410, Feature 1 is installed first, followed by Feature 2 and finally Feature 3. Thus, in environment 1 410, the database upgrade scripts may be run in the order of the script identification numbers. After installation of all three features, the schema version table 110 in database 109 in environment 1 410 would reflect 0060 as the highest script number (i.e., the last database upgrade script to be successfully run).

In one embodiment, in environment 2, 420, Feature 1 may be installed first, followed by Feature 3 and then Feature 2. In this embodiment, the upgrade scripts are run in an order that differs from the numerical order of the script identification numbers. Once Feature 1 is installed, the schema version table 110 in database 109 in environment 2 420 would reflect 0020 as the highest script number. ScriptF associated with Feature 3 could be installed next because the script identification number 0060 is higher than 0020. However, when Feature 2 is attempted to be installed, the script numbers 0030, 0040, 0050 may not be successfully installed because they would not be greater than the last script number installed (e.g., 0060). Thus, in one embodiment, script management module 204 may generate a copy of ScriptF and name that copy with an upgraded script identification number 422 (e.g., 0021). The number may be greater than the highest script number previously installed (e.g., 0020 from ScriptB) but less than the scripts to be installed in the future (e.g., 0030 from ScriptC). Once the copy of ScriptF is run on the database, Feature 2 can be successfully installed because the script identification numbers of all the associated scripts (e.g., ScriptC, ScriptD, ScriptE) are greater than the script identification number of the last script to be installed (e.g., 0021).

Figure 5:
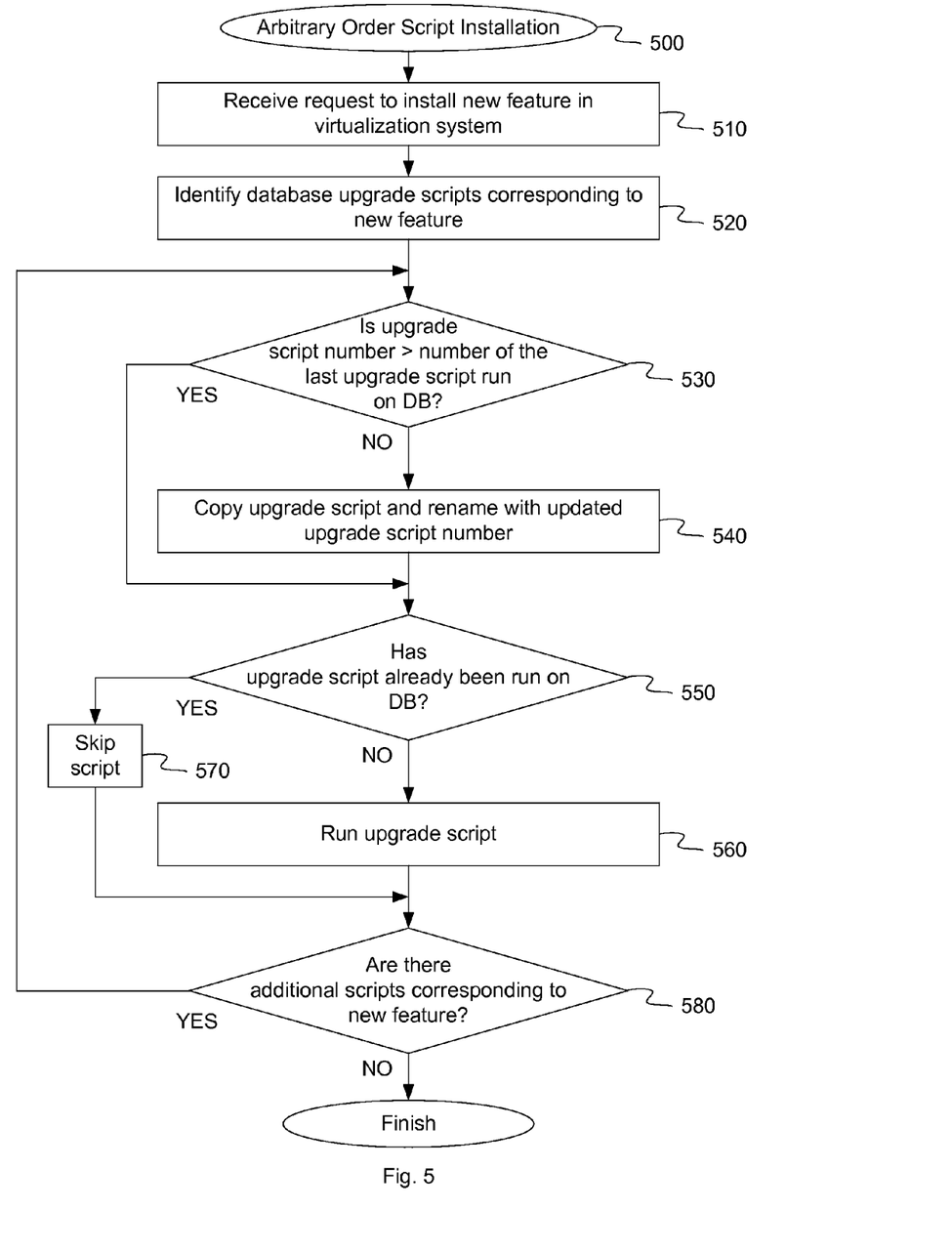
FIG. 5 is a flow diagram illustrating a method for arbitrary ordered script installation, according to an embodiment.

FIG. 5 is a flow diagram illustrating a method 500 for arbitrary ordered script installation, according to an embodiment of the present invention. Arbitrary ordering refers to installing features, and thus running database upgrade scripts, in an order that differs from the order in which the scripts were developed. Arbitrary ordering may also include installing the features in a different order in different virtualization environments. The method 500 may be performed by processing logic that may comprise hardware (e.g., circuitry, dedicated logic, programmable logic, microcode, etc.), software (e.g., instructions run on a processing device to perform hardware simulation), or a combination thereof. The processing logic may run database upgrade scripts in different orders in different virtualization environments. In one embodiment, the method 500 is performed by virtualization manager 114, as shown in FIGS. 1 and 2.

Referring to FIG. 5, at block 510, method 500 receives a request to install or upgrade to a new feature for an application. In one embodiment, request interface module 202 receives the request, which may specify the new feature to install or a currently installed application to upgrade to a new version. The request may be received at the host controller 107, for example, from any entity in the virtualization system, such as one of client devices 101, host server 103, virtual machines 131, or some other entity.

At block 520, method 500 identifies database upgrade scripts corresponding to the new feature. In one embodiment, the request to install the feature may include the corresponding upgrade scripts. In another embodiment, script management module 204 may read database scripts 108 on data store 105 and determine which scripts are associated with the feature. The upgrade scripts may be identified by a name including a version and/or script identification number.

At block 530, method 500 compares the upgrade script identification number of the candidate scripts to the identification number of the last upgrade script run on the database 109. In one embodiment, database interface module 206 may read schema version table 110 which includes an indication of each database upgrade script that has been run on management database 109. Database interface module 206 may compare the identification number or numbers of the script associated with the new feature to be installed (i.e., the candidate upgrade script) with the highest identification number stored in schema version table 110.

If at block 530, method 500 determines that the identification number of the candidate upgrade script is less than the highest identification number in schema version table 110, at block 540, method 500 may initiate a script renaming operation. In one embodiment, database interface module 206 may make a copy of the candidate upgrade script and name that copy with a new name including an identification number that is greater than the highest identification number in schema version table 110. For example, if the original identification number of the candidate upgrade script was 0010 and the highest identification number in schema version table 110 was 0030, script management module 204 may assign an identification number to the copy of 0031.

Figure 6:
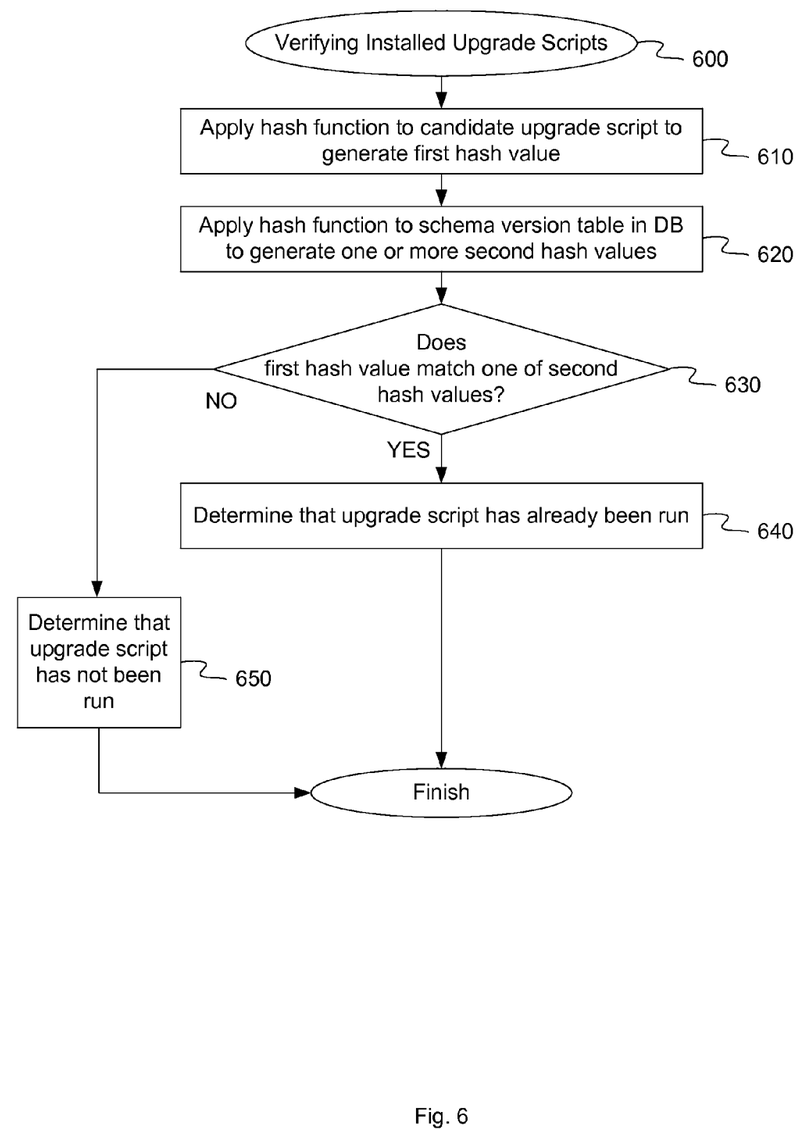
FIG. 6 is a flow diagram illustrating a method for verifying installed upgrade scripts, according to an embodiment.

If at block 530, method 500 determines that the identification number of the candidate upgrade script is greater than the highest identification number in schema version table 110, method 500 may proceed to block 550. At block 550, method 500 may determine whether the database upgrade script has already been run on the database 109. If an upgrade script is renumbered to a lower identification number and then run, the possibility exists that the original version of the script, with the higher identification number may be run on the database at a later time. FIG. 6 details one embodiment, of how the system can determine whether the database upgrade script has already been run.

If at block 550, method 500 determines that the script has not yet been run, at block 560, method 500 runs the script on the management database. Running the script may upgrade the entries 111 in the database 109, such as by adding, removing or changing data, etc., or may upgrade the schema of the database 109. Upon running the script, database interface module 206 may create a new entry in the schema version table for the upgrade script, such as that shown in FIG. 3. If at block 550, method 500 determines that the script has already been run on the database, at block 570, method 500 skips over the running of the candidate script.

At block 580, method 500 determines whether there are any additional database upgrade scripts that correspond to the new feature to be installed. If there are additional features, method 500 may return to block 530 and repeat the operations in blocks 530-570 for each remaining database upgrade script.

FIG. 6 is a flow diagram illustrating a method 600 for verifying installed upgrade scripts, according to an embodiment of the present invention. The method 600 may be performed by processing logic that may comprise hardware (e.g., circuitry, dedicated logic, programmable logic, microcode, etc.), software (e.g., instructions run on a processing device to perform hardware simulation), or a combination thereof. The processing logic may determine whether a database upgrade script was previous installed under a different upgrade script identification number. In one embodiment, the method 600 is performed by virtualization manager 114, as shown in FIGS. 1 and 2.

Referring to FIG. 6, at block 610, method 600 applies a hash function to the candidate upgrade script to generate a first hash value. The hash algorithm may be a cryptographic hash algorithm, such as SHA-2, MD5, or another hash algorithm. In other embodiments, some other function may be used, such as a fingerprinting algorithm, checksum, or other function.

At block 620, method 600 applies the same hash function use at block 610 to the entries in schema version table 110 of database 109 to generate one or more second hash values. The schema version table 110 may store entries corresponding to the upgrade scripts previously run on the database 109. Also included in the table may be the location of the script in the file system and a hash function that uniquely describes the script contents. Script hash module 208 may run the hash function on each of these scripts to generate a hash function, which may be stored, for example, as checksum 308.

At block 630, method 600 compares the first hash value to the one or more second hash values to determine whether the first hash value matches any of the second hash values. The hash values may match if the output of the hash function is the same value. If at block 630, method 600 determines that the first hash value matches one of the second hash values, at block 640, method 600 determines that the upgrade script has been previously run on the database 109. If at block 630, method 600 determines that the second hash value does not match any of the second hash values, at block 650, method 600 determines that the upgrade script has not been previously run on database 109.

Figure 7:
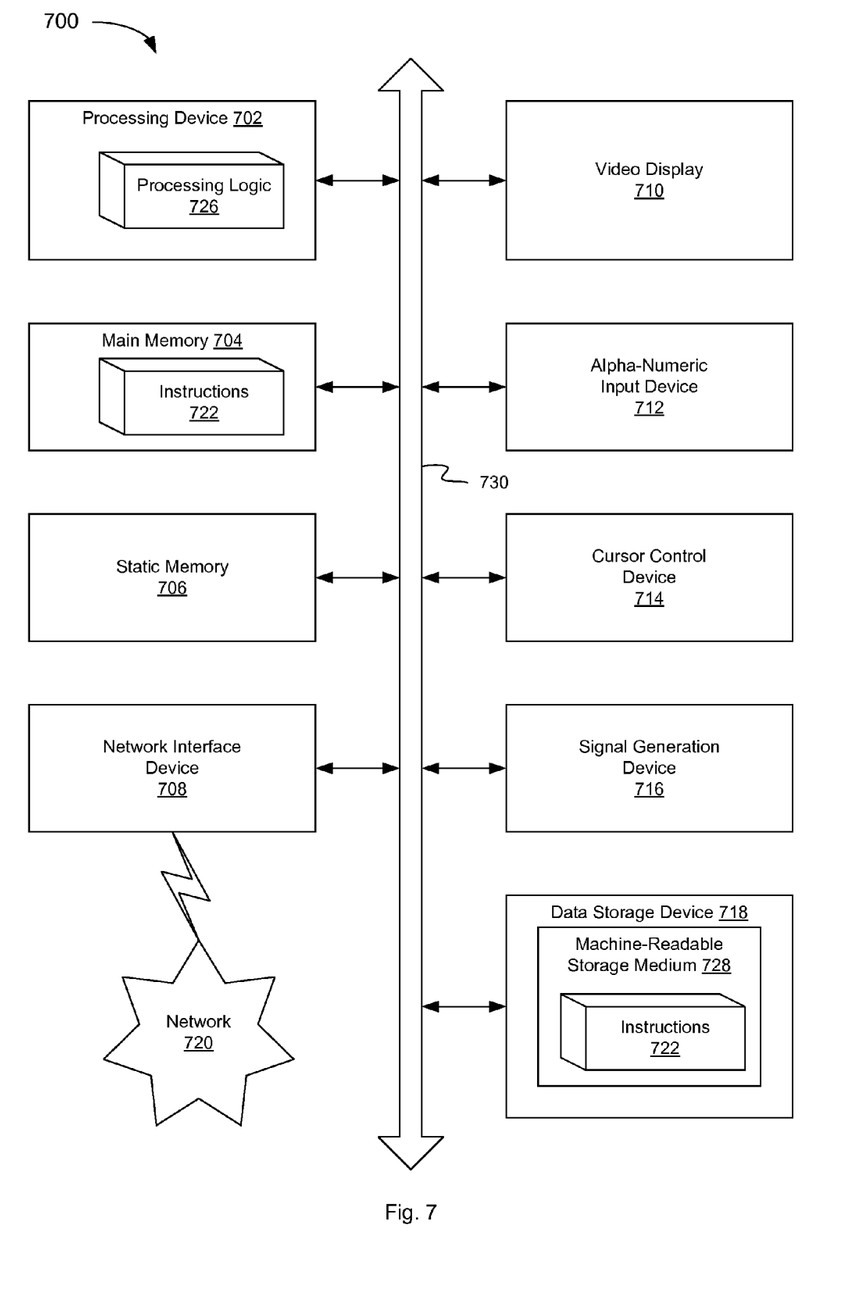
FIG. 7 is a block diagram illustrating a computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a computing device, such as client 101, host server 103 or host controller 107 running virtualization manager 114.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-accessible storage media. The instructions 722 may further be transmitted or received over a network 720 via the network interface device 708.

The machine-readable storage medium 728 may also be used to store instructions for deploying database upgrades to multiple environments in a different order, as described herein. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
   receiving a request to install a new feature in a first virtualization environment;
   identifying a first database upgrade script corresponding to the new feature;
   comparing a first identification number of the first database upgrade script to a second identification number of a second database upgrade script, wherein the second database upgrade script was previously run on a management database in the first virtualization environment;
   in response to a determination that the first identification number is less than the second identification number, generating, by a processing device, a copy of the first database upgrade script and naming the copy of the first database upgrade script with a third identification number that is greater than the second identification number; and
   running the copy of the first database upgrade script on the management database in the first virtualization environment.

2. The method of claim 1, wherein there is a gap in numbering between the second identification number and a fourth identification number of a third database upgrade script, wherein the fourth identification number is greater than the second identification number, and wherein the third identification number is in the gap between the second identification number and the fourth identification number.

3. The method of claim 1, further comprising:
   prior to running the copy of the first database upgrade script on the management database in the first virtualization environment, determining that the first database upgrade script was not previously run on the management database in the first virtualization environment, and wherein running the copy of the first database upgrade script on the management database in the first virtualization environment is in response to determining that the first database upgrade script was not previously run on the management database in the first virtualization environment.

4. The method of claim 3, wherein determining that the first database upgrade script was not previously run comprises:
   applying a hash function to the first database upgrade script to generate a first hash value;
   applying the hash function to a schema version table in the management database to generate one or more second hash values, wherein the schema version table stores one or more database upgrade scripts previously run on the management database in the first virtualization environment; and
   comparing the first hash value to the one or more second hash values to determine whether the first hash value matches one or more of the second hash values.

5. The method of claim 1, further comprising:
   running the first database upgrade script on a management database in a second virtualization environment prior to running the second database upgrade script in the second virtualization environment, wherein the second database upgrade script was not previously run on the management database in the second virtualization environment.

6. The method of claim 1, wherein the first identification number and the second identification number increase sequentially in view of an order in which the first database upgrade script and the second database upgrade script were developed.

7. The method of claim 1, wherein:
   the first virtualization environment comprises a plurality of host computers running a plurality of virtual machines associated with a plurality of virtual disks;
   the processing device is part of a host controller coupled to the plurality of host computers; and
   the management database comprises a plurality of entries pertaining to one or more of the plurality of host computers, the plurality of virtual machines or the plurality of virtual disks.

8. A system comprising:
   a memory; and
   a processing device, operatively coupled to the memory, to:
   receive a request to install a new feature in a first virtualization environment;
   identify a first database upgrade script corresponding to the new feature;
   compare a first identification number of the first database upgrade script to a second identification number of a second database upgrade script, wherein the second database upgrade script was previously run on a management database in the first virtualization environment;
   in response to a determination that the first identification number is less than the second identification number, generate a copy of the first database upgrade script and name the copy of the first database upgrade script with a third identification number that is greater than the second identification number; and
   run the copy of the first database upgrade script on the management database in the first virtualization environment.

9. The system of claim 8, wherein there is a gap in numbering between the second identification number and a fourth identification number of a third database upgrade script, wherein the fourth identification number is greater than the second identification number, and wherein the third identification number is in the gap between the second identification number and the fourth identification number.

10. The system of claim 8, wherein the processing device is further to:
prior to running the copy of the first database upgrade script on the management database in the first virtualization environment, determine that the first database upgrade script was not previously run on the management database in the first virtualization environment, and wherein the processing device is to run the copy of the first database upgrade script on the management database in the first virtualization environment in response to the determination that the first database upgrade script was not previously run on the management database in the first virtualization environment.

11. The system of claim 10, wherein to determine that the first database upgrade script was not previously run, the processing device is further to:
apply a hash function to the first database upgrade script to generate a first hash value;
apply the hash function to a schema version table in the management database to generate one or more second hash values, wherein the schema version table stores one or more database upgrade scripts previously run on the management database in the first virtualization environment; and
compare the first hash value to the one or more second hash values to determine whether the first hash value matches one or more of the second hash values.

12. The system of claim 8, wherein the processing device is further to:
run the first database upgrade script on a management database in a second virtualization environment prior to running the second database upgrade script in the second virtualization environment, wherein the second database upgrade script was not previously run on the management database in the second virtualization environment.

13. The system of claim 8, wherein the first identification number and the second identification number increase sequentially in view of an order in which the first database upgrade script and the second database upgrade script were developed.

14. The system of claim 8, wherein:
the first virtualization environment comprises a plurality of host computers running a plurality of virtual machines associated with a plurality of virtual disks;
the processing device is part of a host controller coupled to the plurality of host computers; and
the management database comprises a plurality of entries pertaining to one or more of the plurality of host computers, the plurality of virtual machines or the plurality of virtual disks.

15. A non-transitory machine-readable storage medium having instructions stored therein that, when executed by a processing device, cause the processing device to:
receive a request to install a new feature in a first virtualization environment;
identify a first database upgrade script corresponding to the new feature;
compare a first identification number of the first database upgrade script to a second identification number of a second database upgrade script, wherein the second database upgrade script was previously run on a management database in the first virtualization environment;

in response to a determination that the first identification number is less than the second identification number, generate, by the processing device, a copy of the first database upgrade script and name the copy of the first database upgrade script with a third identification number that is greater than the second identification number; and
run the copy of the first database upgrade script on the management database in the first virtualization environment.

16. The non-transitory machine-readable storage medium of claim 15, wherein there is a gap in numbering between the second identification number and a fourth identification number of a third database upgrade script, wherein the fourth identification number is greater than the second identification number, and wherein the third identification number is in the gap between the second identification number and the fourth identification number.

17. The non-transitory machine-readable storage medium of claim 15, wherein the instructions are further to cause the processing device to:
prior to running the copy of the first database upgrade script on the management database in the first virtualization environment, determine that the first database upgrade script was not previously run on the management database in the first virtualization environment, and wherein the instructions are to cause the processing device to run the copy of the first database upgrade script on the management database in the first virtualization environment in response to the determination that the first database upgrade script was not previously run on the management database in the first virtualization environment.

18. The non-transitory machine-readable storage medium of claim 16, wherein, to determine that the first database upgrade script was not previously run, the instructions are further to cause the processing device to:
apply a hash function to the first database upgrade script to generate a first hash value;
apply the hash function to a schema version table in the management database to generate one or more second hash values, wherein the schema version table stores one or more database upgrade scripts previously run on the management database in the first virtualization environment; and
compare the first hash value to the one or more second hash values to determine whether the first hash value matches one or more of the second hash values.

19. The non-transitory machine-readable storage medium of claim 15, wherein the instructions are further to cause the processing device to:
run the first database upgrade script on a management database in a second virtualization environment prior to running the second database upgrade script in the second virtualization environment, wherein the second database upgrade script was not previously run on the management database in the second virtualization environment.

20. The non-transitory machine-readable storage medium of claim 15, wherein the first identification number and the second identification number increase sequentially in view of an order in which the first database upgrade script and the second database upgrade script were developed.

21. The non-transitory machine-readable storage medium of claim 15, wherein:

the first virtualization environment comprises a plurality of host computers running a plurality of virtual machines associated with a plurality of virtual disks;
the processing device is part of a host controller coupled to the plurality of host computers; and
the management database comprises a plurality of entries pertaining to one or more of the plurality of host computers, the plurality of virtual machines or the plurality of virtual disks.

* * * * *